B. R. BENJAMIN.
BUNDLE CARRIER FOR HARVESTERS.
APPLICATION FILED DEC. 1, 1916.
1,328,781. Patented Jan. 20, 1920.
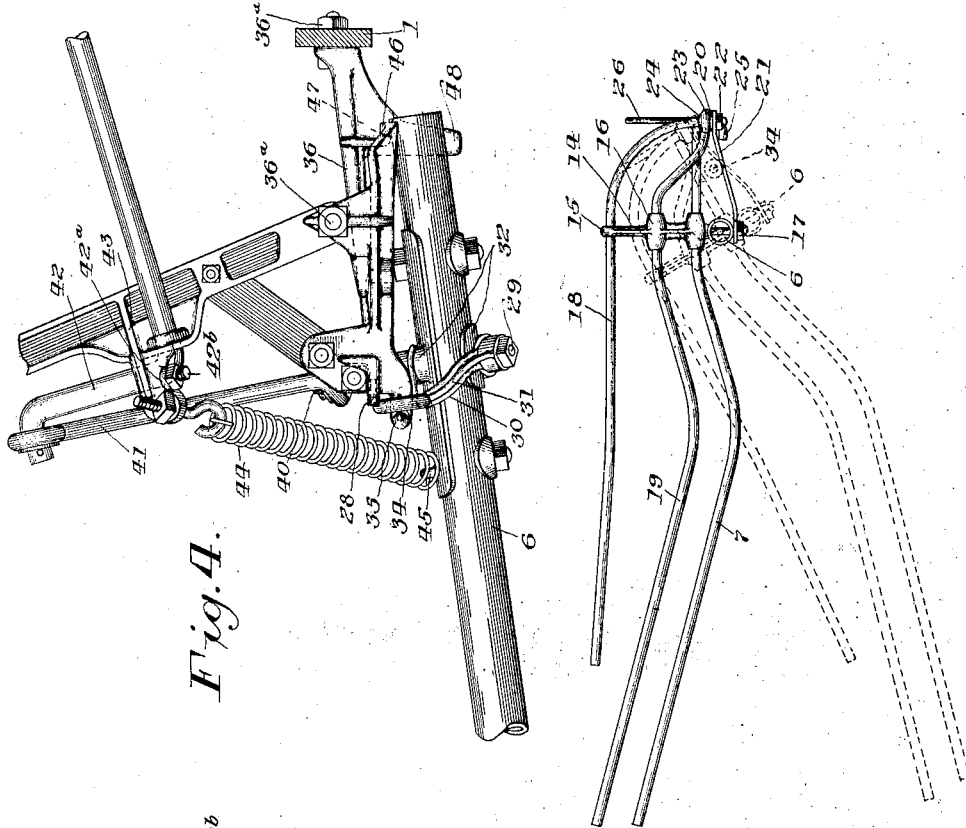
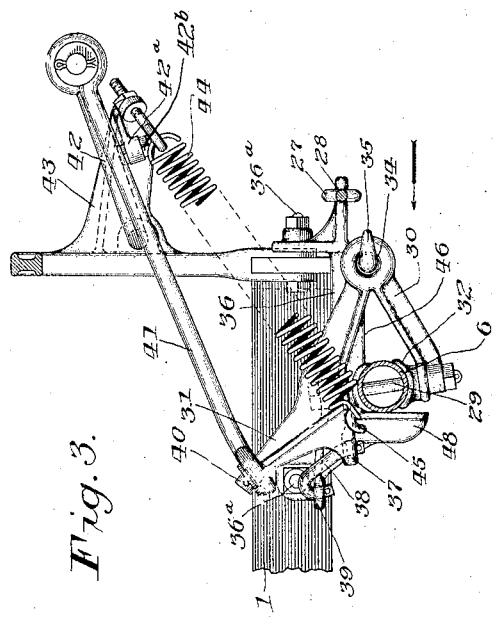
Inventor:
Bert R. Benjamin,
By Chas. E. Lord
Atty.

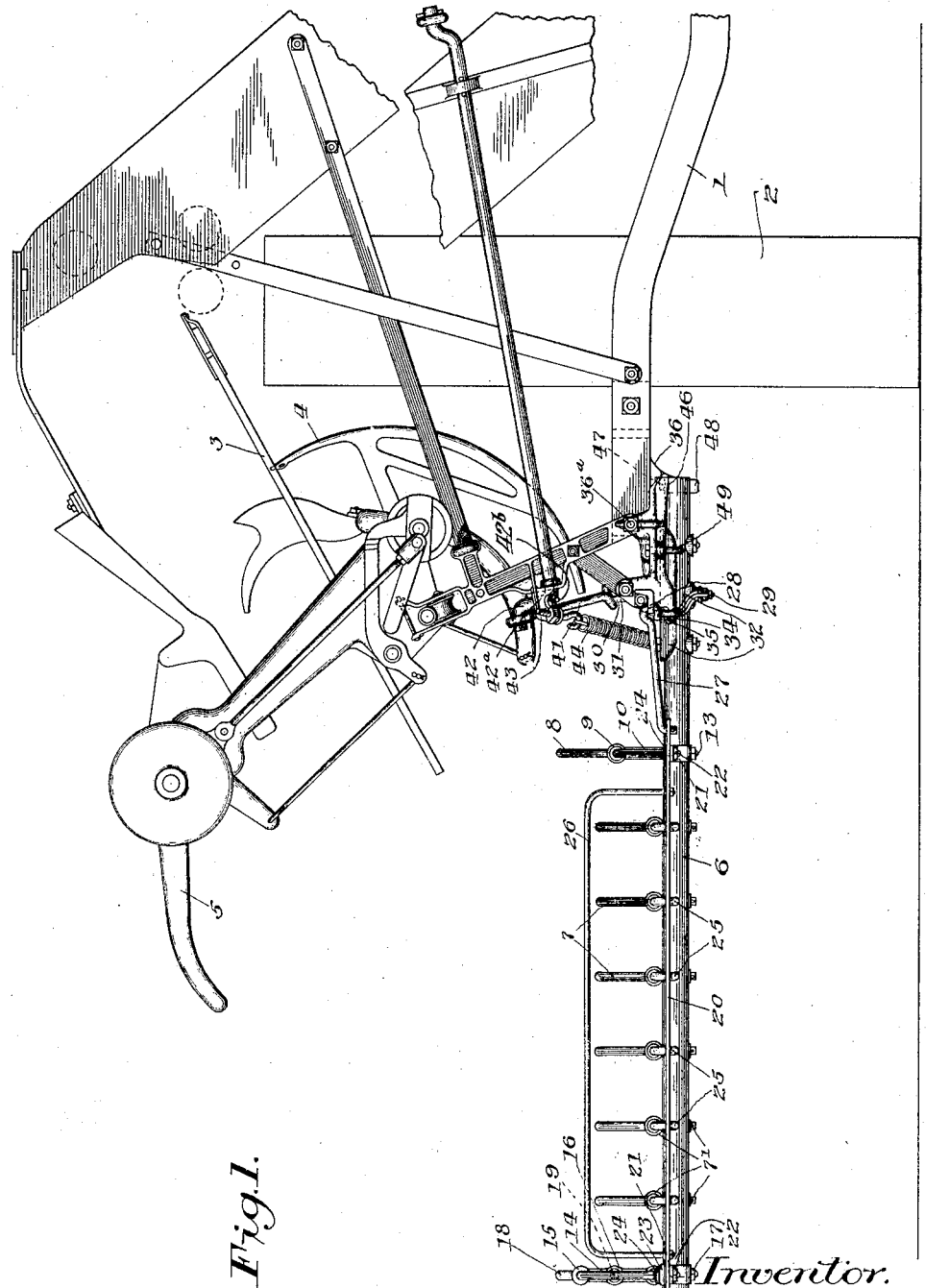

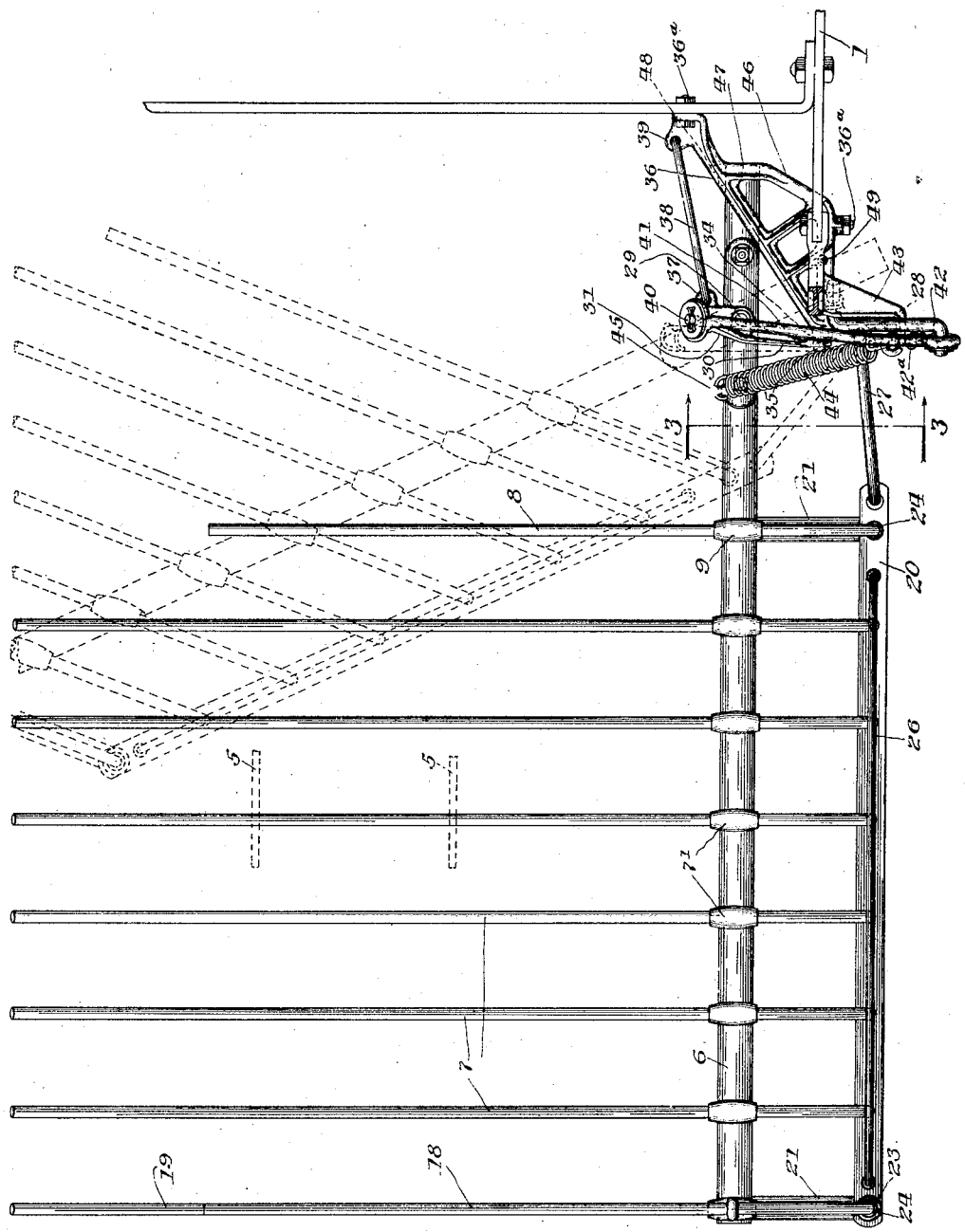

UNITED STATES PATENT OFFICE.

BERT R. BENJAMIN, OF OAK PARK, ILLINOIS, ASSIGNOR, BY MESNE ASSIGNMENTS, TO INTERNATIONAL HARVESTER COMPANY, A CORPORATION OF NEW JERSEY.

BUNDLE-CARRIER FOR HARVESTERS.

1,328,781.     Specification of Letters Patent.     Patented Jan. 20, 1920.

Application filed December 1, 1916. Serial No. 134,541.

*To all whom it may concern:*

Be it known that I, BERT R. BENJAMIN, a citizen of the United States, residing at Oak Park, in the county of Cook and State of Illinois, have invented certain new and useful Improvements in Bundle-Carriers for Harvesters, of which the following is a full, clear, and exact specification.

My invention relates to bundle carriers for harvesters.

Great difficulty has heretofore been experienced in obtaining the complete discharge of bundles from the bundle carrier of a harvester when the bundles fall unevenly thereon or are bunched at one end of the carrier, which frequently occurs when operating on hillsides or rolling ground. Under such conditions certain of the sheaves frequently remain upon the carrier and are dragged along thereby in such a manner as to scatter the grain in the field, threshing out the same, and occasionally necessitating the stopping of the machine to clear the carrier.

My invention has for its object to provide a bundle carrier which at all times and under all conditions will deliver the sheaves therefrom upon the ground with their butts in substantial alinement.

A further object is to provide a carrier that will operate efficiently on hillsides and rolling land and by which the bundles will be deposited evenly upon the ground without dragging.

I attain these objects by providing a construction in which the bundle carrier simultaneously tilts and drops bodily, enabling the carrier to conform to the surface of the ground, and in which the sheaves are removed therefrom when the same is in its delivery position by contact of the stubble in the field with substantially the whole length of the sheaves.

In order that my invention may be clearly and fully disclosed, I have illustrated one embodiment which the same may assume in practice in the accompanying drawings, in which—

Figure 1 is a partial front view of a binder equipped with my improvement.

Fig. 2 is a plan view of the bundle carrier shown in Fig. 1.

Fig. 3 is a detail side elevation, partly in section, taken substantially on line 3—3 of Fig. 2 and looking in the direction of the arrows.

Fig. 4 is a view of the structure shown in Fig. 3 looking toward the right, as indicated by the arrow in Fig. 3.

Fig. 5 is an end elevation of the bundle carrier tines, the same being shown in their tilted position in dotted lines.

The binder shown is of standard construction, including a frame 1 mounted upon a main wheel 2 and a deck 3 through which the usual needle 4 moves and from which the usual sheaf discharging mechanism 5 discharges the bound sheaves. As the binder and the mechanism for operating these last two elements are all standard construction, and *per se* form no part of the present invention, the same need not be herein more specifically described.

In my improved construction a laterally extending bundle carrier support or pipe 6 is pivotally connected to the harvester frame at a point beneath the binder deck 3. This pipe 6 carries on its stubbleward end a plurality of longitudinally extending, transversely spaced tines 7 which are attached to the pipe at points adjacent their front ends in such a manner as to rotate therewith and move in a vertical plane, and at the same time be free to turn relatively thereto in a horizontal plane, sleeve pin and cotter connections 7' being used as the attaching means. As shown in Fig. 5, each of these tines 7 extends downwardly and rearwardly to a point in the rear of and a substantial distance beneath the pipe 6 and there is extended angularly upwardly and rearwardly to form a sheaf supporting surface, the downwardly and rearwardly inclined portions of the tines being engaged with the butts of the sheaves discharged thereon while the upwardly and rearwardly inclined portions engage the heads of the sheaves. Pivotally secured to the pipe 6 and adjacent the innermost tine 7 is a tine 8 which passes through a sleeve 9 integral with a post 10 pivotally mounted on the pipe 6 and secured thereon by a nut 13. The tine 8 extends rearwardly from the sleeve 9 substantially horizontally for a distance equal to that of the downwardly inclined portion of tines 7 and is then inclined upwardly and rearwardly for the remainder of its length. At the outer end of the pipe 6 there is pivotally secured by a nut 17 a post 14 having at its upper end an eye 15, and intermediate the eye 15 and pipe 6 a sleeve 16. Extending, respectively, through the eye and sleeve are tines 18 and 19, the former conforming in contour to the tine 8 and the latter being inclined similarly to the tines 7. It will be clear that the tines 8, 18 and 19 tend to prevent any sheaves from being forced off the side edges of the carrier.

In front of pipe 6 I have provided a bar 20 pivotally secured thereto by means of straps 21 and nuts 13, 17 and 22. The ends of the tines 8 and 18 are also secured to the bar 20 by nuts 22, the tine 19 being provided with an eye 23 through which passes the tine 18, and the tine 19 is secured to the bar 20 by a shoulder 24 on the tine 18. As is clearly shown in Figs. 1 and 5, the tines 7 are formed with hooked ends 25 which pass through suitably spaced apertures in the bar 20. A guard rail 26 is secured to the bar 20 and forms a front wall for the carrier, preventing the sheaves from sliding therefrom. The bar 20 is pivotally connected to the harvester frame by a link 27, the inner end of which is secured at 28 to the harvester. Intermediate the inner tine 8 and the inner end of pipe 6, the latter is pivoted on a pin 29 to a yoke 30 formed on a substantially triangular shaped, vertically disposed, pivoted supporting bracket 31, said pin 29 passing through suitable cleats 32 secured on opposite sides of the pipe. The bracket 31 is pivoted at 34 on a hook 35 integral with a substantially triangular, horizontally disposed casting 36 secured by bolts 36ª to the front and rear sill members of the harvester frame. There is also provided on bracket 31, an eye 37 connected by a link 38 to an eye 39 formed on the casting 36 adjacent the rear sill member. The link 38, therefore, limits or prevents lateral movement of the free end of the bracket 31 with respect to the frame of the machine. At its upper extremity the bracket 31 is provided with an upwardly projecting pin 40 connected by a link 41 secured thereon by a pin and washer to a crank arm 42 journaled on the harvester frame and normally positioned as shown in Fig. 1, and supported on the head of a bolt 42ᵇ carried by a lug or stop 42ª secured to a bracket 43 mounted on the main frame. The position of the link 41 when at rest may be regulated by means of washers inserted under the head of the bolt 42ᵇ and in this way the said link may be adjusted to a position in which the crank 42 is just over the dead center, and when these parts are in this position of adjustment a very slight pressure on the releasing member is required to trip the bundle carrier. Also secured at one end to the bracket 43 is a spring 44, which at its opposite end is attached to a hook 45 integral with the upper cleat 32 and spaced laterally from the pivot pin 29 of the pipe 6. As will be seen in Figs. 1 to 4, the spring normally tends to maintain the carrier in raised position. The inner side of the casting 36 is provided on its under surface with an arcuate track 46, against which bears the inner end of the pipe 6, said pipe normally resting in a slightly concaved end portion 47 of said track and against the end stop 48 integral therewith. As the carrier is folded, the inner end of the pipe rides on the track 46 to a position shown in dotted lines in Fig. 2, where it is secured against displacement and in folded position by a pin 49 which is dropped through a suitable aperture in the casting 36. As the pipe 6 rides on track 46, the tines 7, 8 and 18 will fold in a well known manner, being maintained in parallel relation by the bar 20. As will be seen from an inspection of Fig. 2, the carrier in its folded position is located entirely inside the projected path of movement of the discharge arms 5 shown therein in dotted lines. The spring 44, in addition to maintaining the pipe 6 in raised position, also tends to retain the pipe against the stop 48 formed on the bracket 46; in other words, the spring 44 is so connected to the frame and to the support or pipe 6 that it normally swings the bundle carrier about its pivot 29 from folded position (shown in dotted lines in Fig. 2) to the position shown in full lines in which the support 6 contacts with the stop 48, and in addition to performing this function the spring also raises the carrier bodily about its horizontal pivot 35 and thus controls the movement of the carrier on its vertical and horizontal axes.

In considering the operation of the device, let us assume that the parts are in their bundle receiving position, as shown in Fig. 1, wherein the bundles delivered by the sheaf discharging mechanism may fall upon the tines 7. When a sufficient number of bundles has accumulated upon the carrier, the crank 42 is released by suitable means, as, for instance, by the usual foot pedal, an initial impulse being given to the crank to throw it away from its stop 42ª and release the link connections supporting the pipe 6. The weight of the bundles on the tines 7 will then rotate the bracket 31 about the pivot 35, depressing the pipe 6, as shown in Fig. 4, the inner end of the pipe resting in the recess 47 of the track 46 formed on casting 36. As the pipe is rotated with the bracket 31 about the pivot 35, the tines will also move therewith and assume the position shown in dotted lines in Fig. 5. When the pipe 6 and tines 7 are in this position, the stubble will engage with a rearwardly sweeping effect substantially the whole length of the bundles which are carried thereby and will clean the sheaves from the tines speedily and surely. As soon as the carrier has been emptied of sheaves, the spring 44 will return the same to normal position, the single spring operating to raise the pipe and rotate the same about the pivot 35. It will be noted that during the dropping and raising of the pipe 6 and tines 7, these parts are always maintained in the same relative position and that the tines are given no rotation relative to the pipe. When it is desired to transport the harvester, the carrier may be folded to the position shown in dotted lines in Fig. 2, the pipe 6 pivoting on the bolt 29 in the yoke 30 and the end of the pipe riding on the track 46 and being secured in folded position by the pin 49, all as above described.

While I have in this application specifically described one embodiment of my invention, it is, of course, to be understood that this form of the same is used for purposes of illustration and that various other constructions may be employed without departing from the spirit of the invention, it being my intention to include all such modifications within the scope of the appended claims.

What I claim as new and desire to secure by Letters Patent is:

1. In combination, a frame, a bracket pivoted to said frame on a substantially horizontal pivot and movable in a vertical plane, and a bundle carrier carried by said bracket at a point spaced from the pivotal connection between said bracket and said frame and movable with said bracket.

2. In combination, a frame, a support carried thereby, bundle carrying means mounted on said support, and means connecting said support to said frame in such a manner that said support is movable bodily downwardly from its normal sheaf receiving position at right angles to the line of draft.

3. In combination, a frame, and a bundle carrier including a member pivotally supported intermediate its ends and movable about a plurality of independent pivots on said frame and bodily with respect to said frame.

4. In combination, a harvester frame, a bundle carrier including a laterally extending support and bundle carrying means mounted on said support, and means including a bracket pivotally mounted on the harvester frame whereby a combined dropping and rotary movement about the pivot of said bracket may be simultaneously imparted to the support and bundle carrying means.

5. In combination, a harvester frame, a bracket pivotally mounted on said frame, a support pivoted on said bracket, bundle carrying means mounted on said support, and means whereby said bracket may be rocked in a vertical plane.

6. In combination, a harvester frame, a bracket mounted on a horizontal pivot on said frame, a bundle carrier including a support pivoted intermediate its ends on said bracket, and means permitting said bracket to rock on its pivot.

7. In combination, a harvester frame, a bracket pivotally mounted on said frame, a bundle carrier including a support vertically pivoted intermediate its ends on said bracket and bundle carrying means carried by said support, and means whereby said bracket and said bundle carrier may be rocked vertically with relation to said frame.

8. In combination, a frame, a bundle carrier including a support and bundle carrying means mounted on said support, and means including a bracket pivoted to said frame whereby the support may be given a combined dropping and rotary movement with respect to said frame about an axis eccentric to the axis of said support.

9. In combination, a frame, a bundle carrier including a support pivoted to said frame about a substantially horizontal pivot spaced from the axis of said support, means for retaining said support in an elevated position, and means confining the path of movement of said support so that when released it will describe a conical surface.

10. In combination, a frame, a vertically movable bracket pivoted to said frame, a yoke formed on said bracket, a bundle carrier including a support vertically pivoted in said yoke, means normally retaining said bracket in an elevated position, and means for returning said bracket to its normal position after it has been released.

11. In combination, a frame, a bracket horizontally pivoted to said frame, a bundle carrier including a support vertically pivoted intermediate its ends on said bracket, and single means for swinging said support on its vertical pivot and said bracket on its horizontal pivot.

12. In combination, a frame, a substantially arcuate track mounted on said frame, a bracket pivoted to said frame for movement in a vertical plane, and a bundle carrier including a support pivoted intermediate its ends to said bracket and having one end engaging said track.

13. In combination, a frame, a bracket pivoted to said frame, a bundle carrier including a support vertically pivoted on said bracket, and means including an arcuate track on said frame for supporting and guiding said bundle carrier support as it is swung on its vertical axis.

14. In combination, a harvester frame, a bracket pivoted to said frame, a bundle carrier support pivoted on said bracket, link and crank connections controllable by the operator on said harvester frame connected between a portion of said bracket and said frame and normally maintaining said bracket and support in an elevated position.

15. In combination, a harvester frame, a bracket pivoted to said frame on a substantially horizontal pivot, a bundle carrier support pivoted on said bracket on a substantially vertical pivot, link and crank connections controllable by the operator on said harvester frame connected between a portion of said bracket and said frame, and normally maintaining said bracket and support in an elevated position.

16. In combination, a frame, a bracket horizontally pivoted on said frame, a bundle carrier including a support vertically pivoted on said bracket, means normally maintaining said bracket and support in an elevated position, and single means for swinging said support on its vertical pivot and said bracket on its horizontal pivot after said bracket and support have been released from said retaining means.

17. In combination, a frame, a bracket pivoted on a horizontal axis on said frame, a bundle carrier including a support vertically pivoted on said bracket, means normally retaining said bracket and support in an elevated position, and a spring connected to said frame and to said support at a point remote from the pivotal connection between the support and the bracket for returning said bracket and support to normal position after they have been released from said retaining means.

18. In combination, a frame, a bundle carrier including a support operatively connected to said frame, said support being movable on a vertical axis and bodily downwardly about a horizontal axis spaced from said support, and single means for moving said support on said vertical and horizontal axes.

19. In combination, a frame, a bundle carrier including a support operatively connected to said frame, said support being movable on a vertical axis and bodily downwardly about a horizontal axis spaced from said support and resilient single means for moving said support on said vertical and horizontal axes.

20. In combination, a frame, a bracket pivoted at one end on said frame, a bundle carrier support pivotally mounted on said bracket, bundle carrying means mounted on said support, and means for limiting the lateral movement of the free end of said bracket with respect to said frame.

21. In combination, a frame, a bracket pivoted at one end on said frame, a bundle carrier support mounted on said bracket, bundle carrying means mounted on said support, and a link connection between said bracket and said frame for limiting the lateral movement of the free end of said bracket with respect to said frame.

22. In combination, a frame, a support carried by said frame normally in contact with said frame and bodily movable with respect thereto, bundle carrying means mounted thereon, and yielding means for returning said support bodily to its bundle receiving position after said support has been dumped and for retaining said support in contact with said frame.

In testimony whereof I affix my signature.

BERT R. BENJAMIN.